(12) United States Patent
Kim

(10) Patent No.: US 9,298,519 B2
(45) Date of Patent: Mar. 29, 2016

(54) METHOD FOR CONTROLLING DISPLAY APPARATUS AND MOBILE PHONE

(75) Inventor: Mi-kyung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 150 days.

(21) Appl. No.: 12/886,964

(22) Filed: Sep. 21, 2010

(65) Prior Publication Data

US 2011/0070878 A1 Mar. 24, 2011

(30) Foreign Application Priority Data

Sep. 22, 2009 (KR) ........................ 10-2009-0089640

(51) Int. Cl.
*G06F 9/54* (2006.01)
*H04L 12/40* (2006.01)
(Continued)

(52) U.S. Cl.
CPC ............ *G06F 9/54* (2013.01); *H04L 12/40013* (2013.01); *H04L 67/04* (2013.01);
(Continued)

(58) Field of Classification Search
CPC . H04L 12/2803; H04L 67/04; H04L 12/2827; H04L 67/325; H04L 12/282; H04L 2012/2849; H04L 2012/2841; H04L 2005/2849; H04L 2005/4407; H04L 2005/4408; H04L 2005/4423; H04L 2005/443; H04L 2005/4435; H04L 67/34; H04L 2463/082; H04L 51/046; H04L 21/4126; H04L 21/41407; H04N 7/106; H04N 7/173; H04N 21/4126; H04N 21/43615; H04N 21/4788; H04N 21/482; H04N 5/4403; H04N 21/42204; H04N 21/42224; H04N 1/00283; H04N 1/00291; H04N 1/00297; H04N 1/00307; H04N 2005/4425; H04N 2005/443; H04N 21/42208; H04N 21/4222; H04M 1/72533; H04M 1/04; H04W 4/00; H04W 4/20; G06F 2203/04108; G06F 2203/04808; G06F 3/017; G06F 3/0484; G06F 3/0488; G06F 9/4411

USPC ........... 348/552, 553, 563, 734, 14.02–14.05, 348/838, 51, 539.1; 455/3.06, 414.1, 414.4, 455/556.1, 557, 414, 418–420; 700/17
See application file for complete search history.

(56) References Cited

U.S. PATENT DOCUMENTS 5,124,805 A * 6/1992 Chung et al. .................. 348/838
6,792,143 B1 * 9/2004 Harmovaara ................. 382/189
(Continued)

FOREIGN PATENT DOCUMENTS

CN 1324175 11/2001
CN 1355994 6/2002
(Continued)

OTHER PUBLICATIONS

Chinese Office Action dated Jul. 1, 2014 issued in Counterpart Application No. 201080042246.5.
(Continued)

*Primary Examiner* — Nizar Sivji
(74) *Attorney, Agent, or Firm* — The Farrell Law Firm, P.C.

(57) ABSTRACT

A method for controlling a display apparatus and a mobile phone is provided. According to the method, the display apparatus transmits an application to the mobile phone, the mobile phone executes the application and transmits specific information received from a user, and the display apparatus controls an execution state of the application according to the specific information. Accordingly, a user controls the display apparatus using the mobile phone.

8 Claims, 14 Drawing Sheets

(51) Int. Cl.
*H04M 1/725* (2006.01)
*H04N 21/41* (2011.01)
*H04N 21/475* (2011.01)
*H04L 29/08* (2006.01)

(52) U.S. Cl.
CPC ............ *H04L 67/125* (2013.01); *H04L 67/34* (2013.01); *H04M 1/7253* (2013.01); *H04N 21/4126* (2013.01); *H04N 21/4758* (2013.01); *G06F 2209/549* (2013.01); *H04M 1/72544* (2013.01)

(56) References Cited

U.S. PATENT DOCUMENTS

| | | | |
|---|---|---|---|
| 6,988,070 | B2 | 1/2006 | Kawasaki et al. |
| 7,376,441 | B2 | 5/2008 | Lee |
| 2001/0041982 | A1 | 11/2001 | Kawasaki et al. |
| 2003/0040334 | A1* | 2/2003 | Lee ................................ 455/557 |
| 2003/0140343 | A1* | 7/2003 | Falvo et al. ...................... 725/51 |
| 2004/0073915 | A1* | 4/2004 | Dureau .............................. 725/9 |
| 2005/0147247 | A1 | 7/2005 | Westberg et al. |
| 2005/0147301 | A1 | 7/2005 | Wang et al. |
| 2005/0185102 | A1* | 8/2005 | Fairhurst ........................ 348/734 |
| 2006/0028337 | A1* | 2/2006 | Li .............................. 340/539.1 |
| 2006/0030380 | A1* | 2/2006 | Pentinpuro ................. 455/575.3 |
| 2006/0068917 | A1 | 3/2006 | Snoddy et al. |
| 2006/0148518 | A1* | 7/2006 | Ferris ........................... 455/553.1 |
| 2010/0180312 | A1* | 7/2010 | Toya ................................ 725/78 |
| 2010/0183797 | A1* | 7/2010 | Yamaku et al. ................ 426/661 |
| 2010/0267448 | A1* | 10/2010 | Snoddy et al. .................. 463/30 |
| 2011/0043372 | A1* | 2/2011 | Ohki ........................... 340/825.22 |
| 2011/0083141 | A1* | 4/2011 | Westberg et al. ................ 725/31 |
| 2012/0042344 | A1* | 2/2012 | Pan .................................. 725/60 |
| 2012/0131098 | A1* | 5/2012 | Wood et al. .................... 709/203 |

FOREIGN PATENT DOCUMENTS

| | | |
|---|---|---|
| CN | 1404296 | 3/2003 |
| CN | 1938974 | 3/2007 |
| CN | 101119782 | 2/2008 |
| CN | 101378487 | 3/2009 |
| JP | 2003-223448 | 8/2003 |
| JP | 2003-271302 | 9/2003 |
| JP | 2005-517226 | 6/2005 |
| JP | 2007-256833 | 10/2007 |
| JP | 2009-187094 | 8/2009 |
| KR | 1020030043564 | 6/2003 |
| KR | 1020050119368 | 12/2005 |
| KR | 1020070068020 | 6/2007 |
| WO | WO 00/78050 | 12/2000 |
| WO | WO 2004/107099 | 12/2004 |
| WO | WO 2009/114247 | 9/2009 |

OTHER PUBLICATIONS

Japanese Office Action dated Jul. 22, 2014 issued in Counterpart Application No. 2012-529695.
Australian Examination Report dated Sep. 24, 2014 issued in Counterpart Application No. 2010298903.
Chinese Office Action dated Jan. 6, 2015 issued in counterpart application No. 201080042246.5.
Chinese Office Action dated Jun. 2, 2015 issued in counterpart application No. 201080042246.5, 42 pages.

* cited by examiner

METHOD FOR CONTROLLING DISPLAY APPARATUS AND MOBILE PHONE

PRIORITY

This application claims priority to Korean Patent Application No. 10-2009-0089640, which was filed on Sep. 22, 2009, in the Korean Intellectual Property Office, the entire disclosure of which is incorporated herein by reference.

BACKGROUND OF THE INVENTION

1. Field of the Invention

The present invention generally relates to a method for controlling a display apparatus and a mobile phone, and more particularly, to method of controlling a display apparatus and a mobile phone in order to input a user's manipulation into the display apparatus using the mobile phone.

2. Description of the Related Art

A television (TV) is generally controlled through a remote controller. As the technologies of the TV have been improved, the TV is able to provide diverse functions and execute applications. However, general remote controllers typically are unable to receive diverse user's manipulations due to their limited functions. Also, in order to improve the function of the remote controller, an increase in price is unavoidable. However, users generally do not wish to buy an expensive remote controller.

A mobile phone is one of the necessities for people today, and is also an article that is always carried by users. Also, the mobile phone is able to perform wireless communication and provide many functions that are not provided by the remote controller.

Users desire to use the functions of the TV with ease. Therefore, there is a need for a method for controlling a display apparatus such as a TV using a mobile phone.

SUMMARY

Embodiments of the present invention overcome the above disadvantages and other disadvantages not described above.

An aspect of the present invention provides a method for controlling a display apparatus and a mobile phone, in which the display apparatus transmits an application to the mobile phone, the mobile phone executes the application and transmits specific information received from a user to the display apparatus, and the display apparatus controls a state of the application according to the specific information.

According to an aspect of the present invention, there is provided a method of controlling a display apparatus which is communicably connected with a mobile phone, the method including storing a first application to be executed in the display apparatus and a second application to be executed in the mobile phone, executing the first application, transmitting the second application to the mobile phone, receiving specific information from the mobile phone when the second application is being executed in the mobile phone, and controlling an execution state of the first application according to the received specific information.

The method further includes receiving user information from the mobile phone, recognizing a user of the mobile phone using the received user information.

According to another aspect of the present invention, there is provided a method of controlling a mobile phone which is communicably connected with a display apparatus which stores a first application to be executed in the display apparatus and a second application to be executed in the mobile phone, the method including receiving the second application from the display apparatus when the first application is being executed in the display apparatus, executing the received second application, receiving specific information according to a user's manipulation when the second application is being executed, and transmitting the received specific information to the display apparatus.

According to a further aspect of the present invention, there is provided a method of controlling a mobile phone which is communicably connected with a display apparatus which stores a first application to be executed in the display apparatus and a second application to be executed in the mobile phone, the method including receiving the second application from the display apparatus when the first application is being executed in the display apparatus, executing the received second application, receiving specific information according to a user's manipulation when the second application is being executed, carrying out a process on the received specific information and extracting resulting information of the process, and transmitting the extracted resulting information of the process to the display apparatus.

According to the present invention, methods of controlling the display apparatus and the mobile phone are provided, in which the display apparatus transmits an application to the mobile phone, the mobile phone executes the application and transmits specific information received from a user, and the display apparatus controls an execution state of the application according to the specific information, so that the user can control the display apparatus using the mobile phone.

Also, since a user's manipulation is input using the mobile phone, the user is able to use various types of inputting means provided on the mobile phone.

Additional aspects and advantages of the present invention will be set forth in the detailed description, will be clear from the detailed description, or may be learned by practicing the invention.

BRIEF DESCRIPTION OF THE DRAWING FIGURES

The above and/or other aspects will be more apparent by describing in detail exemplary embodiments, with reference to the accompanying drawings in which.

Figure 1:
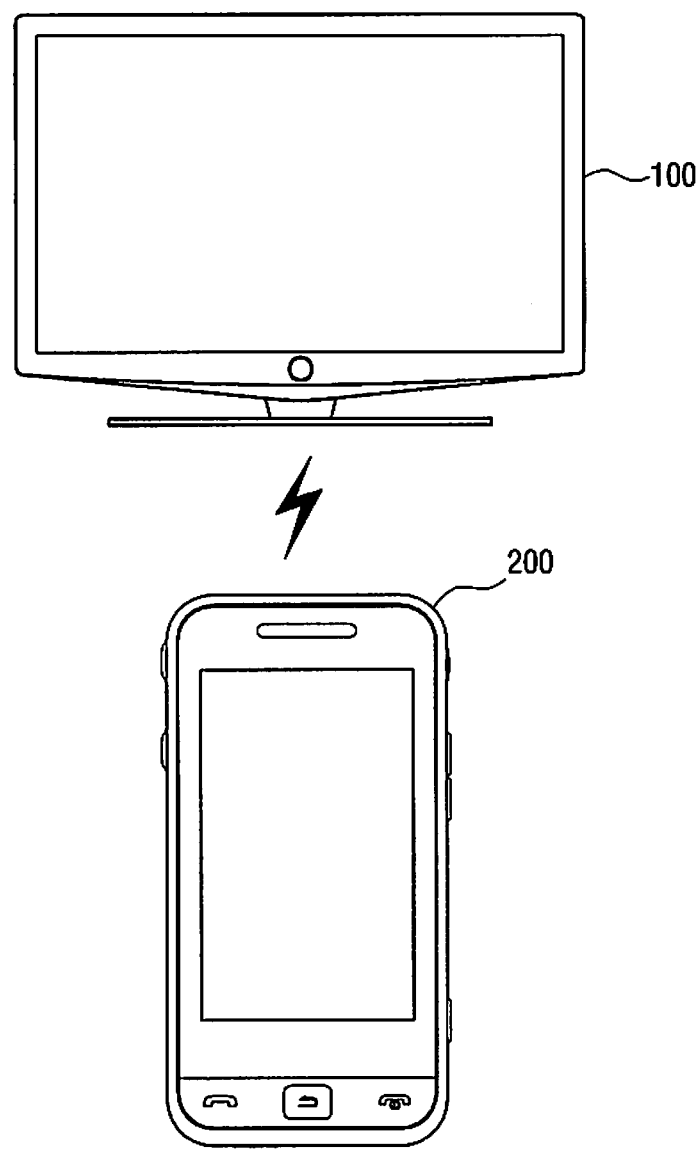
FIG. 1 illustrates a control system of a TV and a mobile phone according to an embodiment of the present invention.

DETAILED DESCRIPTION OF EMBODIMENTS
OF THE PRESENT INVENTION

Hereinafter, embodiments of the present invention will be described in greater detail with reference to the accompanying drawings.

In the following description, same reference numerals are used for the same elements even when they are depicted in different drawings. The matters defined in the description, such as detailed construction and elements, are provided to assist in a comprehensive understanding of the present invention. Thus, it is apparent that the embodiments can be carried out without those specifically defined matters. Also, functions or elements known in the related art are not described in detail since they would obscure the invention with unnecessary detail.

FIG. 1 illustrates a control system of a TV 100 and a mobile phone 200 according to an embodiment of the present invention. As shown in FIG. 1, the TV 100 is communicably connected with the mobile phone 200. More specifically, the TV 100 and the mobile phone 200 are communicably connected with each other through a wireless network such as by Bluetooth®, Zigbee, or a Wireless Local Area Network (WLAN).

The TV 100 may store and execute an application. More specifically, the TV 100 may store a TV application and a mobile phone application for a single application. Also, the TV 100 transmits the mobile phone application to the mobile phone 200.

The TV application recited herein refers to an application that is provided to be executed in the TV 100. The TV application functions to display diverse information and images on a screen.

The mobile phone application recited herein refers to an application that is provided to be executed in the mobile phone 200. The mobile phone application functions to enable the mobile phone 200 to serve as a user interface apparatus.

The TV application and the mobile phone application are executed in association with each other when the TV 100 and the mobile phone 200 are communicably connected with each other. Accordingly, if a user inputs a desired manipulation to the mobile phone 200 when the TV application and the mobile phone application are being executed, the TV 100 controls an execution state of the TV application according to the input manipulation.

For example, in the case of a quiz game application, the TV application functions to execute and display contents of a quiz, whether an answer to a question in the quiz is correct or not, and a process of the quiz, and the mobile phone application functions to receive an answer from a user. Accordingly, the TV 100 displays the content of the quiz on the screen and the mobile phone 200 receives manipulation information about the answer of the quiz from the user.

If the control system of the TV 100 and the mobile phone 200 is used as described above, the user can control the application executed in the TV 100 using the mobile phone 200.

Figure 2:
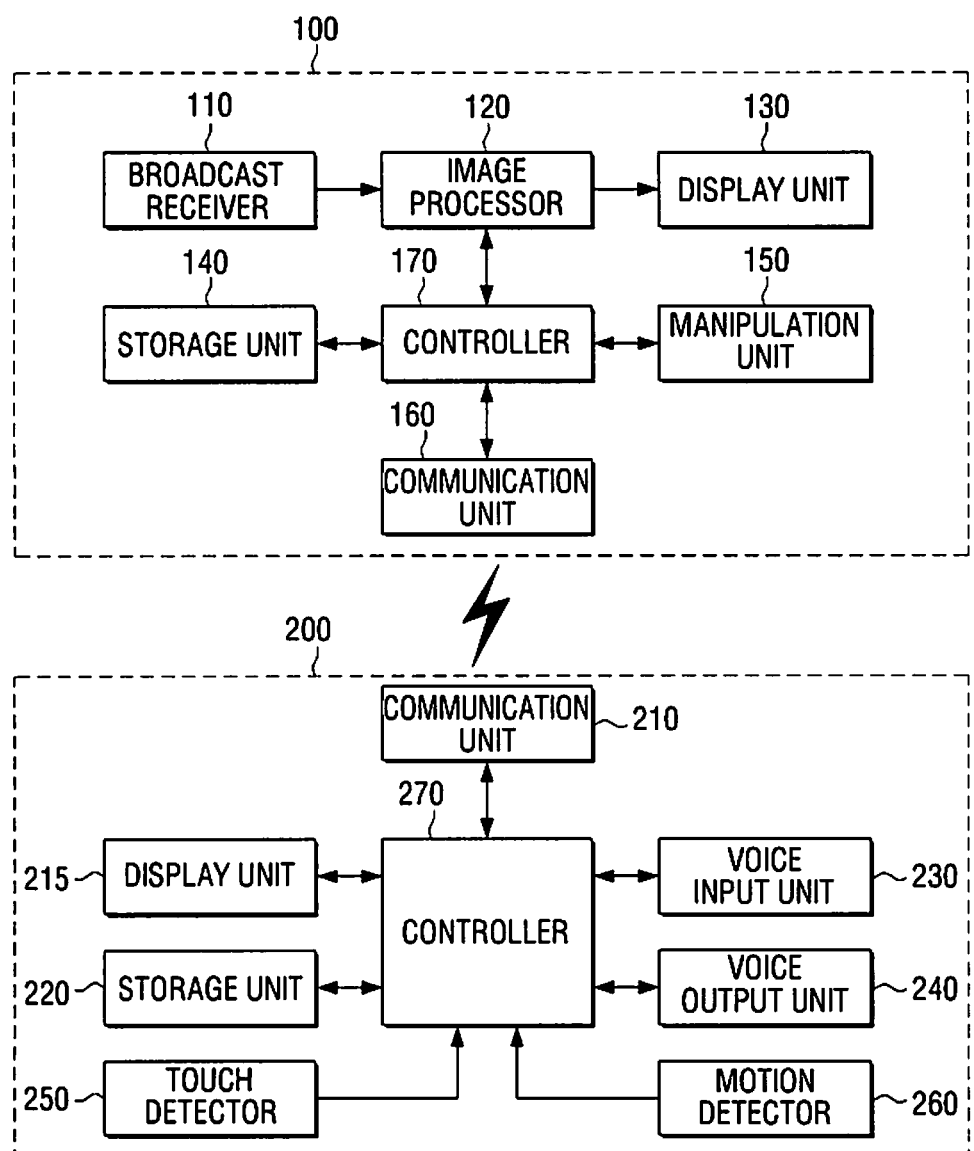
FIG. 2 is a block diagram illustrating the TV and the mobile phone according to an embodiment of the present invention.

FIG. 2 is a block diagram illustrating the TV 100 and the mobile phone 200 according to an embodiment of the present invention. As shown in FIG. 2, the TV 100 includes a broadcast receiver 110, an image processor 120, a display unit 130, a storage unit 140, a manipulation unit 150, a communication unit 160, and a controller 170.

The broadcast receiver 110 receives a broadcast signal from a broadcasting station or a satellite in a wired or wireless manner and demodulates the broadcast signal. The broadcast receiver 110 transmits the received broadcast signal to the image processor 120.

The image processor 120 performs signal-processing such as decompression and sharpness or clarity enhancement with respect to the broadcast signal received from the broadcast receiver 110. The image processor 120 transmits a broadcast image which has been decompressed and has an improved sharpness or clarity to the display unit 130.

The display unit 130 outputs the broadcast image transmitted from the image processor 120 on the screen of the TV 100.

The storage unit 140 stores diverse programs for operating the TV 100, and the storage unit 140 stores the applications. More specifically, the storage unit 140 stores a TV application and a mobile phone application for a single application.

The storage unit 140 may be implemented as a hard disk drive (HDD) or a non-volatile memory.

The manipulation unit 150 receives a command from a user and transmits the command to the controller 170. The manipulation unit 150 may be implemented as a remote controller (not shown), a manipulation button (not shown) provided on the TV 100, or a touch screen.

The communication unit 160 is communicably connected with an external apparatus through the wired or wireless network. More specifically, the communication unit 160 is communicably connected with the mobile phone 200 through a wireless network using one of Bluetooth®, Zigbee, and a wireless LAN. The communication unit 160 transmits the mobile phone application to the mobile phone 200.

The controller 170 controls overall operation of the TV 100. More specifically, the controller 170 executes the TV application. The controller 170 controls the mobile phone application to be transmitted to the mobile phone 200. Also, the controller 170 receives specific information from the mobile phone 200 when the mobile phone application is being executed in the mobile phone 200.

The specific information recited herein is information for controlling the TV application. More specifically, the specific information may be information relating to a user's manipulation input through the mobile phone 200 or resulting information of a process carried out by the mobile phone 200.

The information relating to the user's manipulation is input as the user manipulates the mobile phone 200. The mobile phone 200 may receive voice information, touch manipulation information, and motion information of the user. Accordingly, if the specific information is information relating to a user's manipulation, the specific information may be one of the user's voice information, the user's touch manipulation information, and the motion information.

The resulting information of the process refers to information relating to a result of processing the information input by the user by the mobile phone 200. The process refers to a process required in the TV application. For example, if the TV application is a quiz application, the process refers to a process on whether the information input by the user is a correct answer or not. The mobile phone 200 processes the information input by the user and transmits a result of the process to the TV 100. In this case, the specific information is resulting information of the process. For example, if the TV application is a quiz application, the mobile phone 200 carries out a process on whether an answer is correct or not using the voice information, the touch manipulation information, and the motion information input by the user. Accordingly, the TV 100 receives the resulting information on whether the answer is correct or not from the mobile phone 200.

The controller 170 controls an execution state of the TV application according to the received specific information.

More specifically, if the mobile phone 200 receives voice information of the user as the specific information, the controller 170 receives the voice information from the mobile phone 200. The controller 170 recognizes the received voice information as text information through speech recognition, and controls the execution state of the TV application according to the recognized text information.

Also, the mobile phone 200 may directly process the input voice information. More specifically, the mobile phone 200 receives the voice information of the user as the specific information, recognizes the voice information as text information through speech recognition, processes the text information, and extracts resulting information of the process. In this case, the controller 170 receives the resulting information of the process from the mobile phone 200. The controller 170 controls the execution state of the TV application according to the received resulting information.

If the mobile phone 200 receives touch manipulation information of the user as the specific information, the controller 170 receives the touch manipulation information from the mobile phone 200. The controller 170 controls the execution state of the TV application according to the received touch manipulation information.

The controller 170 may recognize the received touch manipulation information as text information through handwriting recognition. In this case, the controller 170 executes the execution state of the TV application according to the recognized text information.

The mobile phone 200 may also receive the touch manipulation information of the user as the specific information, recognize the touch manipulation information as text information through handwriting recognition, process the text information, and extract resulting information of the process. In this case, the controller 170 receives the resulting information from the mobile phone 200 and controls the execution state of the TV application according to the resulting information.

Also, the mobile phone 200 may receive the touch manipulation information of the user as the specific information, process the touch manipulation information, and extract resulting information of the process. In this case, the controller 170 receives the resulting information from the mobile phone 200 and controls the execution state of the TV application according to the received resulting information.

T mobile phone 200 may receive motion information as the specific information. In this case, the controller 170 receives the motion information from the mobile phone 200 and controls the execution state of the TV application according to the received motion information.

As described above, the controller 170 receives various types of specific information from the mobile phone 200 and controls the execution state of the TV application according to the specific information.

The controller 170 receives user information from the mobile phone 200. The controller 170 recognizes a user of the mobile phone 200 using the received user information. Once the controller 170 recognizes the user of the mobile phone 200, the controller 170 is able to identify a plurality of mobile phones when they are connected to the TV 100. Accordingly, if a plurality of mobile phones are connected to the TV 100, the controller 170 can identify from which mobile phone the specific information is received. Accordingly, the controller 170 enables a plurality of users to share the TV application.

As is further shown in FIG. 2, the mobile phone 200 includes a communication unit 210, a display unit 215, a storage unit 220, a voice input unit 230, a voice output unit 240, a touch detector 250, a motion detector 260, and a controller 270.

The communication unit 210 is communicably connected with an external apparatus, such as TV 100, through a mobile communication network, a wireless communication network, and the Internet. The mobile communication network may be a Global System for Mobile communications (GSM) network or a Wideband Code Division Multiple Access (WCDMA) network. The wireless communication network may be connected through Bluetooth® or Zigbee. The Internet may be connected through a wireless LAN.

The communication unit 210 transmits specific information to the TV 100. The specific information recited herein is information for controlling the TV application. More specifically, the specific information may be information relating to a user's input which is input through the voice input unit 230, the touch detector 250, and the motion detector 260 of the mobile phone 200, or resulting information of a process carried out by the controller 270 of the mobile phone 200.

The display unit 215 displays an image for providing functions of the mobile phone 200. The display unit 215 displays Graphic User Interfaces (GUIs) for the user's manipulation on a screen. More specifically, the display unit 215 displays a screen on which the mobile phone application is being executed.

The storage unit 220 stores programs for executing various functions of the mobile phone 200. The storage unit 220 stores the mobile phone application received from the TV 100. The storage unit 220 may be realized as an HDD or a non-volatile memory.

The voice input unit 230 receives a voice of a user. More specifically, the voice input unit 230 converts the voice of the user into voice information consisting of electric signals and transmits the converted voice information to the controller 270.

The voice output unit 240 outputs a voice signal transmitted from the controller 270 to a speaker.

The touch detector 250 detects touch manipulation information of a user. More specifically, the touch detector 250 may be realized as a touch screen for detecting a user's touch manipulation on a display screen. The touch detector 250 transmits the touch manipulation information of the user to the controller 270.

The motion detector 260 detects motion information regarding a motion of the mobile phone 200. More specifically, the motion detector 260 may be realized as an acceleration sensor or a gyro sensor. The motion detector 260 transmits the detected motion information to the controller 270.

The controller 270 controls overall operation of the mobile phone 200. More specifically, the controller 270 receives the mobile phone application from the TV 100 when the TV application is being executed in the TV 100. The controller 270 executes the received mobile phone application. When the mobile phone application is being executed, the controller 270 receives specific information according to a user's manipulation and transmits the specific information to the TV 100.

The mobile phone 200 receives the voice information of the user through the voice input unit 230, the touch manipulation information of the user through the touch detector 250, and the motion information of the mobile phone 200 through the motion detector 260. Accordingly, if the specific information is information relating to a user's manipulation, the specific information may be one of the user's voice information, the user's touch manipulation information, and the motion information of the mobile phone 200.

More specifically, if the voice information of the user is input through the voice input unit 230 as the specific information, the controller 270 transmits the input voice information to the TV 100. If the touch manipulation information of the user is input through the touch detector 250 as the specific information, the controller 270 transmits the input touch manipulation information to the TV 100. If the motion information is input through the motion detector 260 as the specific information, the controller 270 transmits the input motion information to the TV 100.

If the controller 270 is able to process the specific information, the controller 270 receives the specific information according to the user's manipulation when the mobile phone application is being executed. Then, the controller 270 processes the input specific information and extracts resulting information of the process, and transmits the extracted resulting information to the TV 100.

The resulting information of the process refers to information relating to a result of processing information input by the user by the mobile phone 200. The process recited herein refers to a process that is required in the TV application. For example, if the TV application is a quiz application, the process refers to a process on whether information input by the user is a correct answer or not. The mobile phone 200 processes the information input by the user and transmits the result of the process to the TV 100. For example, if the TV application is a quiz application, the mobile phone 200 carries out a process on whether an answer is correct or not using the voice information, the touch manipulation information, and the motion information input by the user. Accordingly, in this case, the resulting information of the process is information on whether the answer is correct or not. That is, the TV 100 receives the information on whether the answer is correct or not from the mobile phone 200.

More specifically, if the voice information of the user is input as the specific information, the controller 270 recognizes the voice information as text information through speech recognition. The controller 270 processes the text information and extracts resulting information of the process. Also, the controller 270 controls the extracted resulting information to be transmitted to the TV 100.

If the touch manipulation information of the user is input as the specific information, the controller 270 recognizes the touch manipulation information as text information through handwriting recognition. The controller 270 processes the text information and extracts resulting information of the process. Also, the controller 270 controls the extracted resulting information to be transmitted to the TV 100.

Also, if the touch manipulation information of the user is input as the specific information, the controller 270 processes the touch manipulation information and extracts resulting information of the process. The controller 270 controls the extracted resulting information to be transmitted to the TV 100.

As described above, the mobile phone 200 receives the specific information from the user and transmits it to the TV 100 or processes the input specific information and transmits resulting information of the process to the TV 100.

Figure 3A:
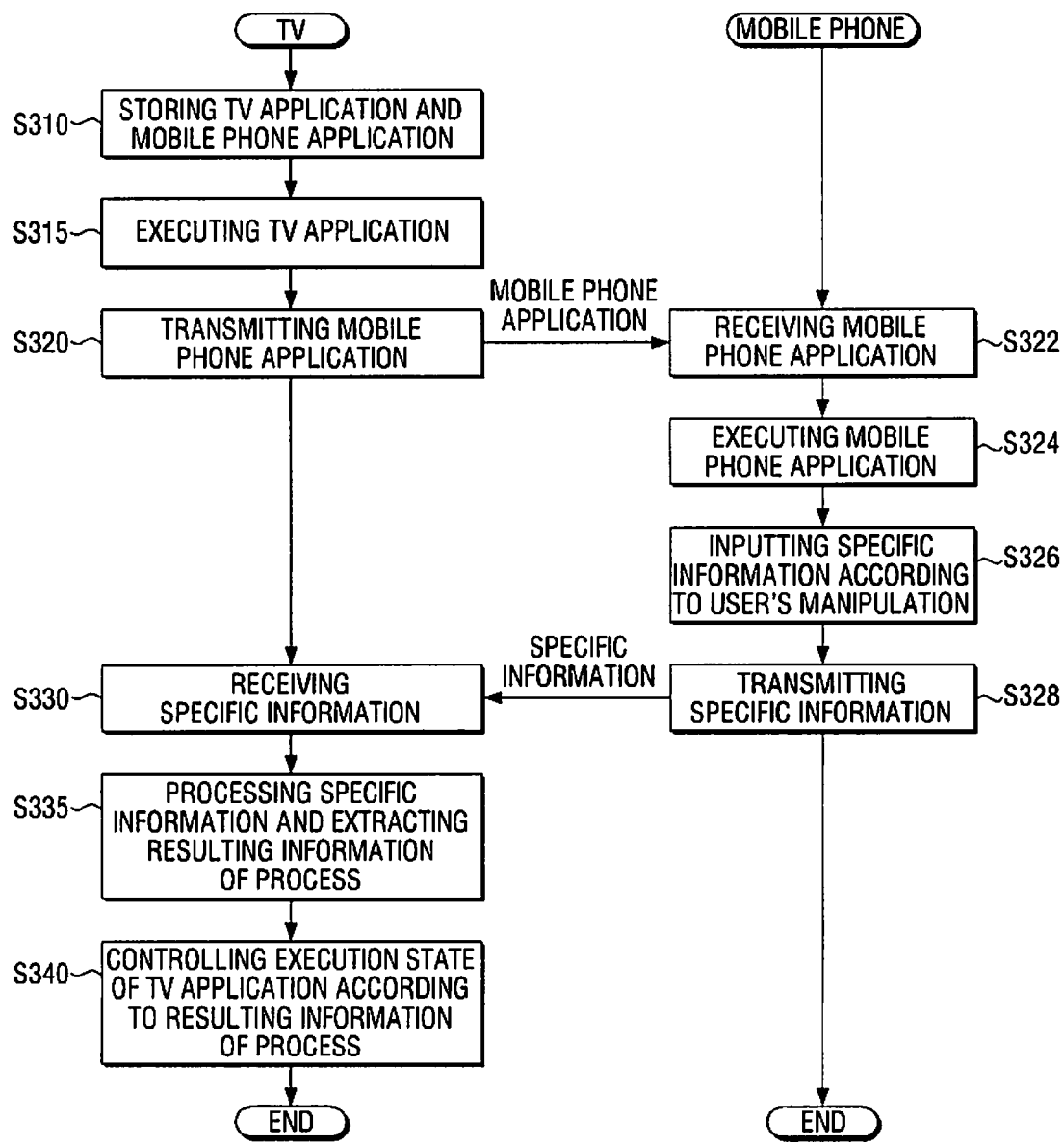
FIG. 3A is a flowchart illustrating a method for controlling the TV and the mobile phone when the TV processes specific information according to an embodiment of the present invention.

Hereinafter, a method of controlling the TV 100 and the mobile phone 200 will be explained with reference to FIGS. 3A and 3B. FIG. 3A is a flowchart illustrating a method for controlling the TV 100 and the mobile phone 200 if the TV 100 processes specific information according to an embodiment of the present invention.

The TV 100 stores a TV application and a mobile phone application in step S310. The TV 100 executes the TV application in step S315. After that, the TV 100 transmits the mobile phone application to the mobile phone 200 in step S320.

Then, the mobile phone 200 receives the mobile phone application in step S322 and then executes the mobile phone application in step S324.

The mobile phone 200 receives specific information according to a user's manipulation in step S326. The mobile phone 200 then transmits the specific information to the TV 100 in step S328. More specifically, the mobile phone 200 may receive voice information of the user through the voice input unit 230, touch manipulation information of the user through the touch detector 250, and motion information of the mobile phone 200 through the motion detector. Accordingly, if the specific information is information relating to a user's manipulation, the specific information may be one of the user's voice information, the user's touch manipulation information, and the motion information.

More specifically, if the voice information of the user is input through the voice input unit 230 as the specific information, the mobile phone 200 transmits the input voice information to the TV 100. If the user's touch manipulation information is input through the touch detector 250 as the specific information, the mobile phone 200 transmits the input touch manipulation information to the TV 100. If the motion information is input through the motion detector 260 as the specific information, the mobile phone 200 transmits the input motion information to the TV 100.

The TV 100 receives the specific information from the mobile phone 200 in step S330. The TV 100 processes the received specific information and extracts resulting information of the process in step S335. After that, the TV 100 controls the execution state of the TV application according to the resulting information of the process in step S340.

More specifically, if the mobile phone 200 receives voice information of the user as the specific information, the TV 100 receives the voice information from the mobile phone 200. Then, the TV 100 recognizes the received voice information as text information through speech recognition and controls the execution state of the TV application according to the recognized text information.

If the mobile phone 200 receives touch manipulation information of the user as the specific information, the TV 100 receives the touch manipulation information from the mobile phone 200. Then, the TV 100 controls the execution state of the TV application according to the received touch manipulation information. Also, the TV 100 may recognize the touch manipulation information as text information through handwriting recognition. In this case, the TV 100 controls the execution state of the TV application according to the recognized text information.

Also, the mobile phone 200 may receive motion information as the specific information. In this case, the TV 100 receives the motion information from the mobile phone 200 and controls the execution state of the TV application according to the received motion information.

As described above, the TV 100 receives various types of specific information from the mobile phone 200 and controls the execution state of the TV application according to the specific information.

Figure 3B:
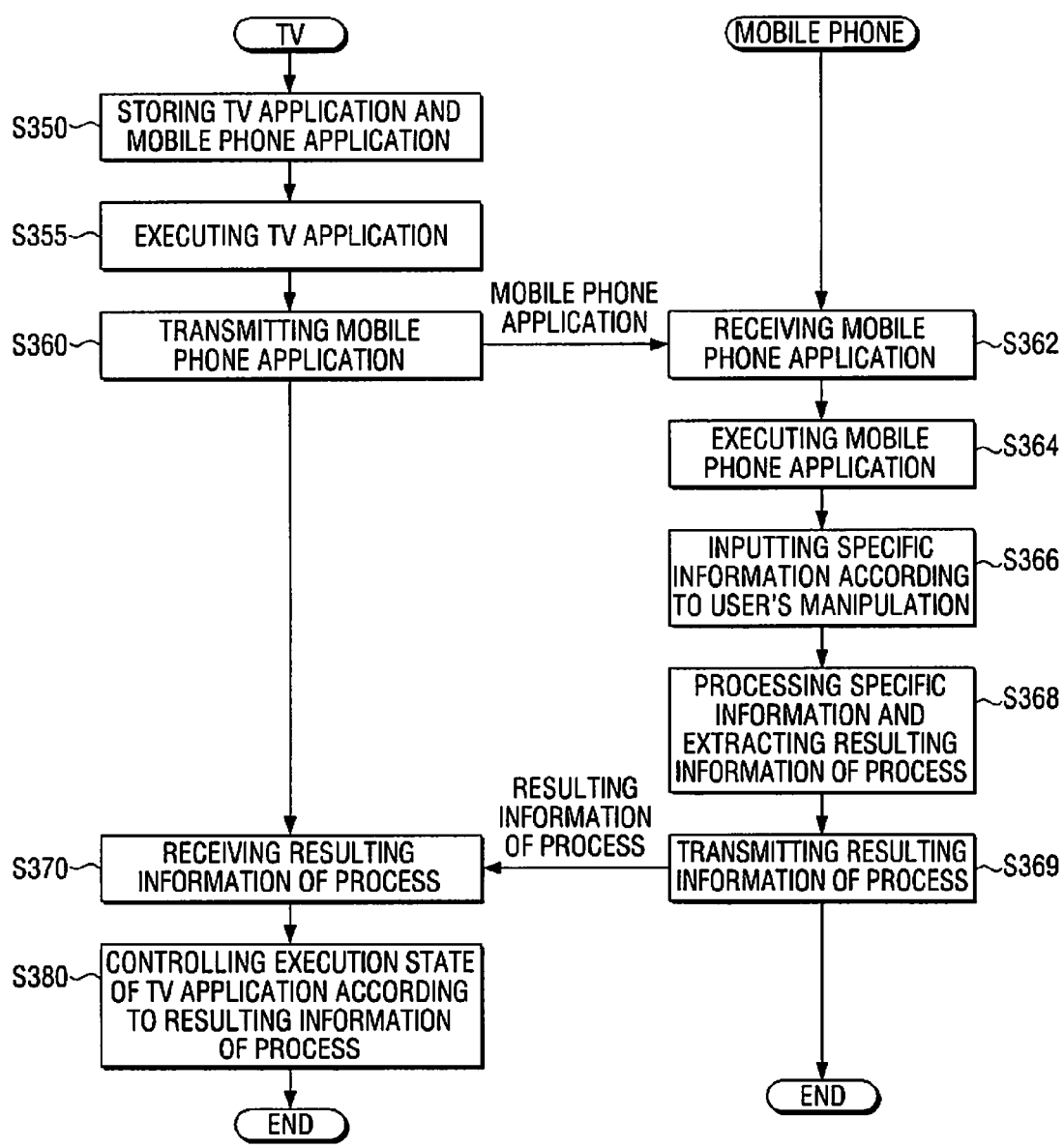
FIG. 3B is a flowchart illustrating a method for controlling the TV and the mobile phone when the mobile phone processes specific information according to an embodiment of the present invention.

FIG. 3B is a flowchart illustrating a method for controlling the TV 100 and the mobile phone 200 when the mobile phone 200 processes specific information according to an embodiment of the present invention.

The TV 100 stores a TV application and a mobile phone application in step S350. The TV 100 executes the TV application in step S355. After that, the TV 100 transmits the mobile phone application to the mobile phone 200 in step S360.

The mobile phone 200 receives the mobile phone application in step S362 and executes the mobile phone application in step S364.

After that, the mobile phone 200 receives specific information according to a user's manipulation in step S366, and then transmits the specific information to the TV 100. More specifically, the mobile phone 200 receives one of voice information of the user through the voice input unit 230, touch manipulation information of the user through the touch detector 250, and motion information of the mobile phone 200 through the motion detector 260. Accordingly, if the specific information is information relating to a user's manipulation, the specific information may be one of the user's voice information, the user' touch manipulation information, and the motion information of the mobile phone 200.

More specifically, if the user's voice information is input as the specific information through the voice input unit 230, the mobile phone 200 transmits the input voice information to the TV 100. Also, if the user's touch manipulation information is input as the specific information through the touch detector 250, the mobile phone 200 transmits the input touch manipulation information to the TV 100. If the motion information is input as the specific information through the motion detector 260, the mobile phone 200 transmits the input motion information to the TV 100.

The mobile phone 200 processes the input specific information and extracts resulting information of the process in step S368, and then transmits the resulting information of the process to the TV 100 in step S369.

More specifically, if the user's voice information is input as the specific information, the mobile phone 200 recognizes the voice information as text information through speech recognition. The mobile phone 200 processes the text information and extracts resulting information of the process. The mobile phone 200 transmits the extracted resulting information to the TV 100.

If the user's touch manipulation information is input as the specific information, the mobile phone 200 recognizes the input touch manipulation information as text information through handwriting recognition. The mobile phone 200 processes the text information and extracts resulting information of the process. The mobile phone 200 transmits the extracted resulting information to the TV 100.

Also, if the user's touch manipulation information is input as the specific information, the mobile phone 200 processes the touch manipulation information and extracts resulting information of the process. The mobile phone 200 transmits the extracted resulting information to the TV 100.

As described above, the mobile phone 200 receives the specific information from the user, processes the input specific information, and transmits the resulting information of the process to the TV 100.

The TV 100 receives the resulting information of the process in step S370. The TV 100 controls the execution state of the TV application according to the resulting information of the process in step S380.

As described above, the TV 100 receives various types of resulting information from the mobile phone 200 and controls the execution state of the TV application according to the resulting information.

Hereinafter, an example in which a quiz application is executed will be explained with reference to FIGS. 4A to 8C.

Figure 4A:
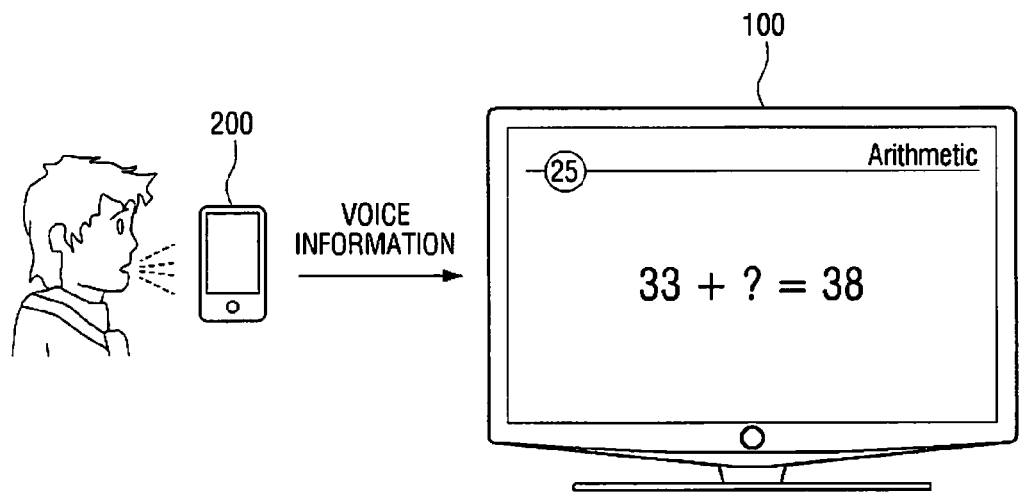
FIG. 4A illustrates a case where voice information is transmitted to the TV when a user inputs a voice into the mobile phone according to an embodiment of the present invention.

FIG. 4A illustrates a case where voice information is transmitted to the TV 100 when a user inputs a voice into the mobile phone 200. As shown in FIG. 4A, when the user inputs a voice into the mobile phone 200 in order to input an answer to a quiz, the mobile phone 200 transmits voice information to the TV 100. Then, the TV 100 carries out a process on whether the received voice information is a correct answer or not and executes a quiz application for a TV to determine whether the answer is correct or not.

Figure 4B:
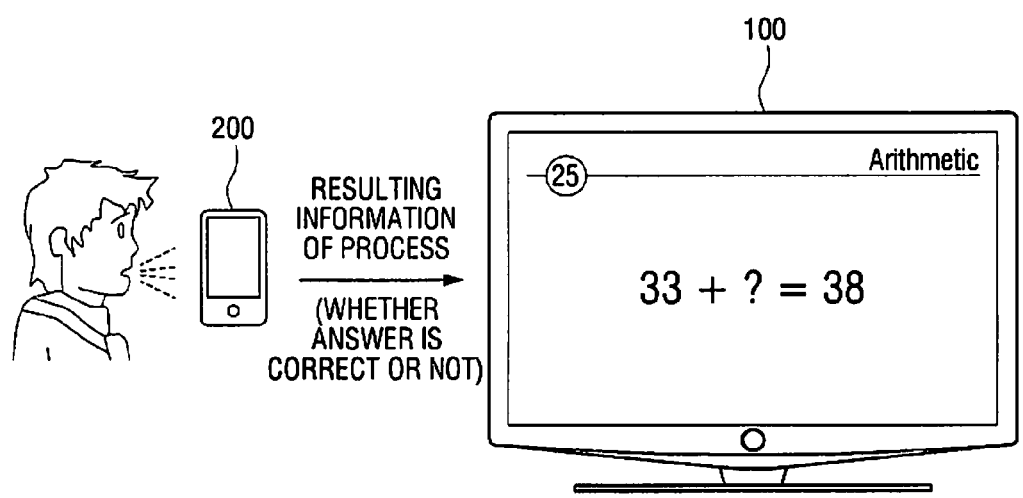
FIG. 4B illustrates a case where resulting information of a process is transmitted to the TV when a user inputs a voice into the mobile phone according to an embodiment of the present invention.

FIG. 4B illustrates a case where resulting information of a process is transmitted to the TV 100 when a user inputs a voice into the mobile phone 200. As shown in FIG. 4B, when the user inputs a voice into the mobile phone 200 in order to input an answer to a quiz, the mobile phone 200 processes the input voice information and transmits resulting information of the process (that is, information on whether the answer is correct or not) to the TV 100. Then, the TV 100 executes a TV quiz application to determine whether the answer is correct or not using the received resulting information.

Figure 5A:
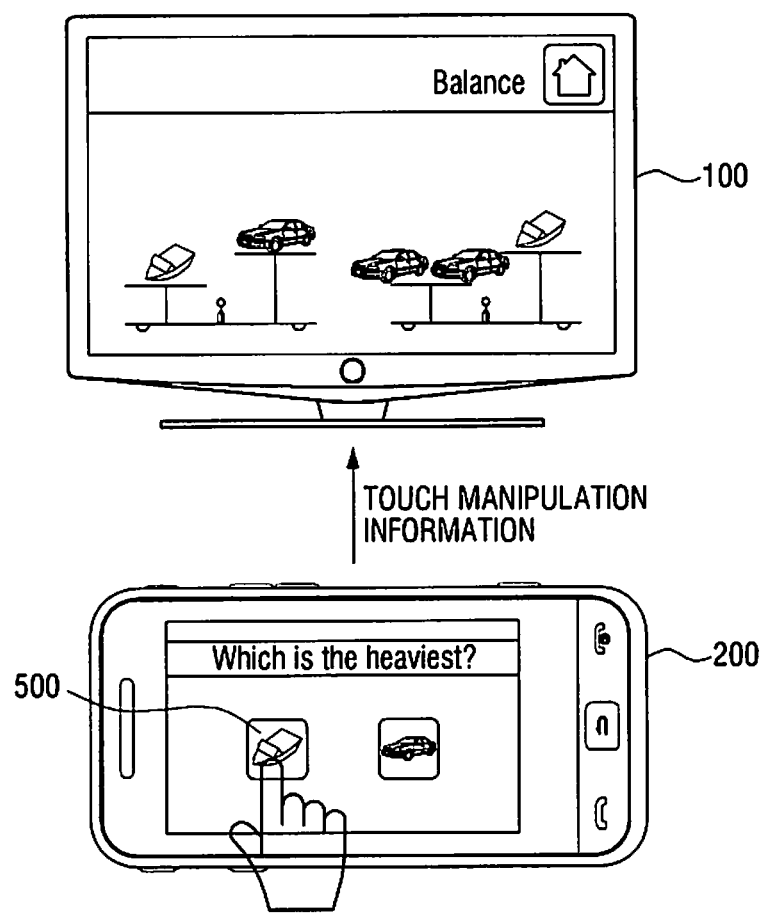
FIG. 5A illustrates a case where touch manipulation information is transmitted to the TV when a user inputs a touch manipulation into the mobile phone according to an embodiment of the present invention.

FIG. 5A illustrates a case where touch manipulation information is transmitted to the TV 100 when a user inputs a touch manipulation into the mobile phone 200. As shown in FIG. 5A, when the user inputs a touch manipulation on an answer icon 500 displayed on the mobile phone 200 in order to input an answer to a quiz, the mobile phone 200 may transmit the touch manipulation information to the TV 100. Then, the TV 100 carries out a process on whether the received touch manipulation information is a correct answer or not and executes a TV quiz application to determine whether the answer is correct or not.

Figure 5B:
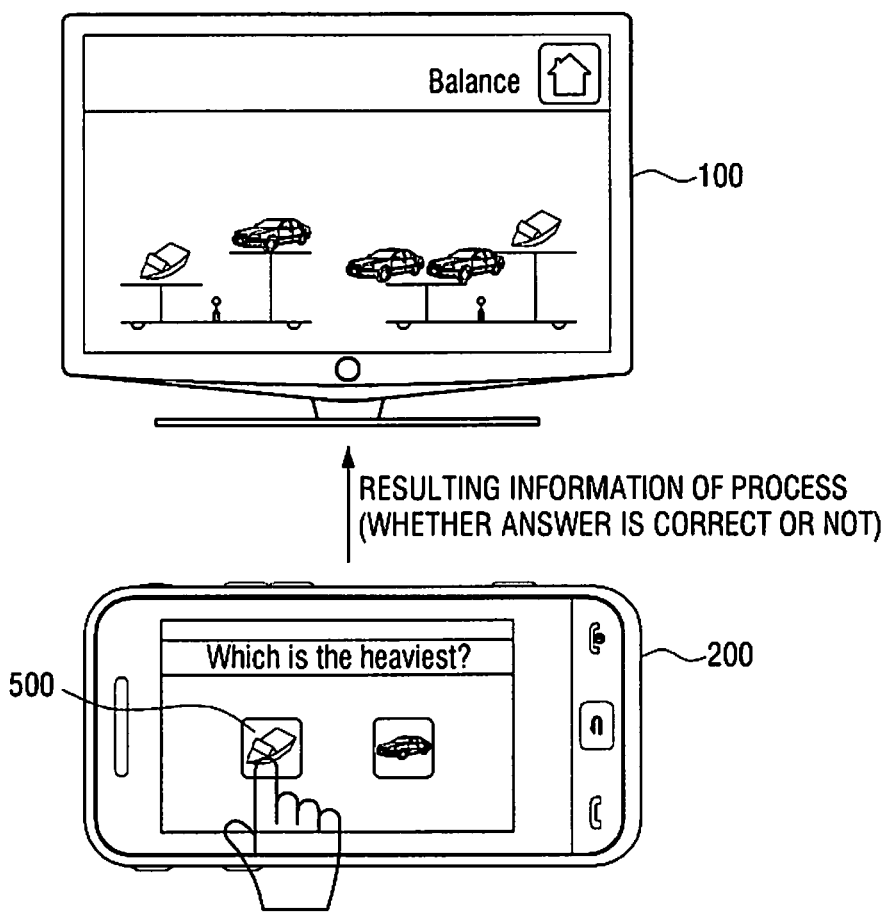
FIG. 5B illustrates a case where resulting information of a process is transmitted to the TV when a user inputs a touch manipulation into the mobile phone according to an embodiment of the present invention.

FIG. 5B illustrates a case where resulting information of a process is transmitted to the TV 100 when a user inputs a touch manipulation into the mobile phone 200. As shown in FIG. 5B, when the user inputs a touch manipulation on an answer icon 500 displayed on the mobile phone 200 in order to input an answer to a quiz, the mobile phone 200 processes the touch manipulation information and transmits resulting information of the process (that is, information on whether the answer is correct or not) to the TV 100. Then, the TV 100 executes a TV quiz application to determine whether the answer is correct or not using the received resulting information.

Figure 6A:
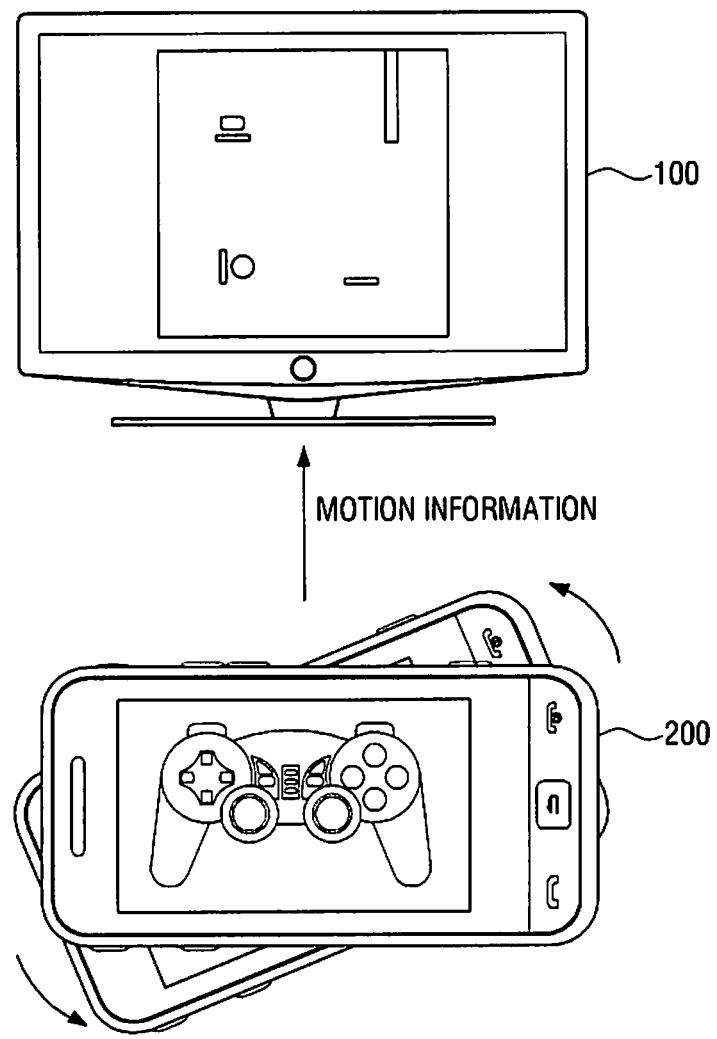
FIG. 6A illustrates a case where motion information is transmitted to the TV when a user inputs a motion into the mobile phone according to an embodiment of the present invention.

FIG. 6A illustrates a case where motion information is transmitted to the TV 100 when a user inputs a motion into the mobile phone 200. As shown in FIG. 6A, when the user inputs a motion into the mobile phone 200 in order to input an answer to a quiz, the mobile phone 200 transmits the motion information to the TV 100. Then, the TV 100 carries out a process on whether the received motion information is a correct answer or not and executes a TV quiz application to determine whether the answer is correct or not.

Figure 6B:
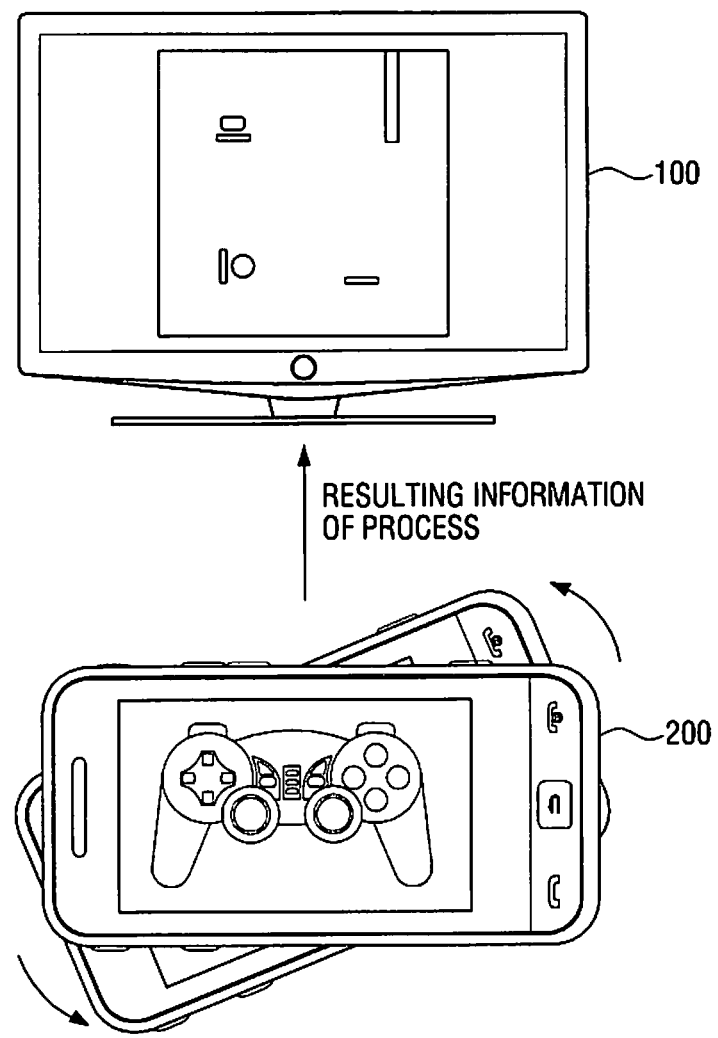
FIG. 6B illustrates a case where resulting information of a process is transmitted to the TV when a user inputs a motion into the mobile phone according to an embodiment of the present invention.

FIG. 6B illustrates a case where resulting information of a process is transmitted to the TV 100 when a user inputs a motion to the mobile phone 200. As shown in FIG. 6B, when the user inputs a motion into the mobile phone 200 in order to input an answer to a quiz, the mobile phone 200 processes the motion information and transmits resulting information of the process to the TV 100. Then, the TV 100 executes a TV quiz application to determine whether the answer is correct or not using the received resulting information.

Figure 7A:
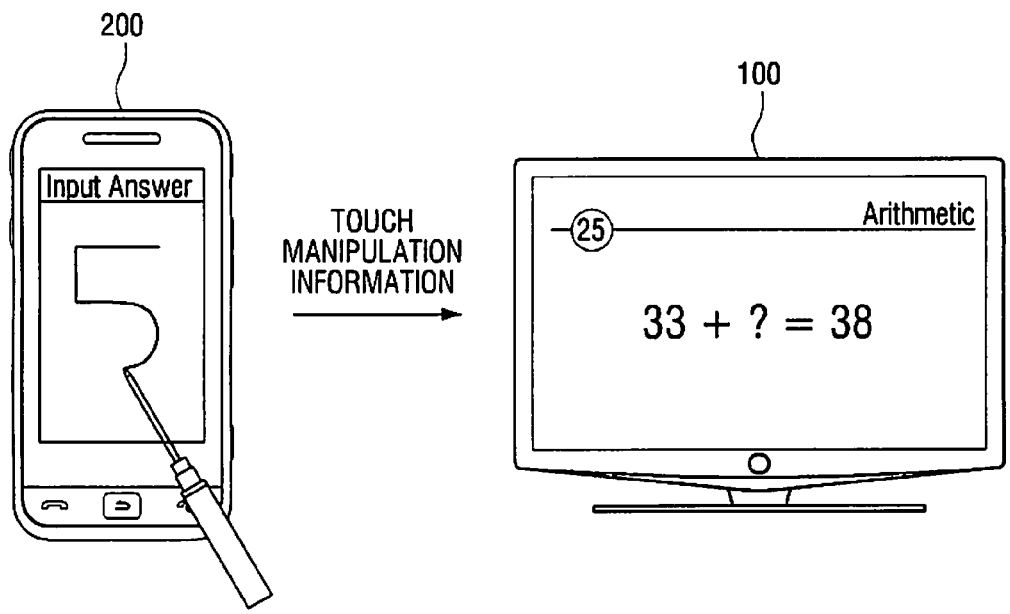
FIG. 7A illustrates a case where touch manipulation information is transmitted to the TV when a user inputs a handwriting touch manipulation into the mobile phone according to an embodiment of the present invention.

FIG. 7A illustrates a case where touch manipulation information is transmitted to the TV 100 when a user inputs a handwriting touch manipulation into the mobile phone 200. As shown in FIG. 7A, when the user inputs a handwriting touch manipulation into a touch screen of the mobile phone 200 in order to input an answer to a quiz, the mobile phone 200 transmits the touch manipulation information to the TV 100. Then, the TV 100 recognizes the touch manipulation information as text information through handwriting recognition, carries out a process on whether the recognized text information is a correct answer or not, and executes a TV quiz application to determine whether the answer is correct or not.

Figure 7B:
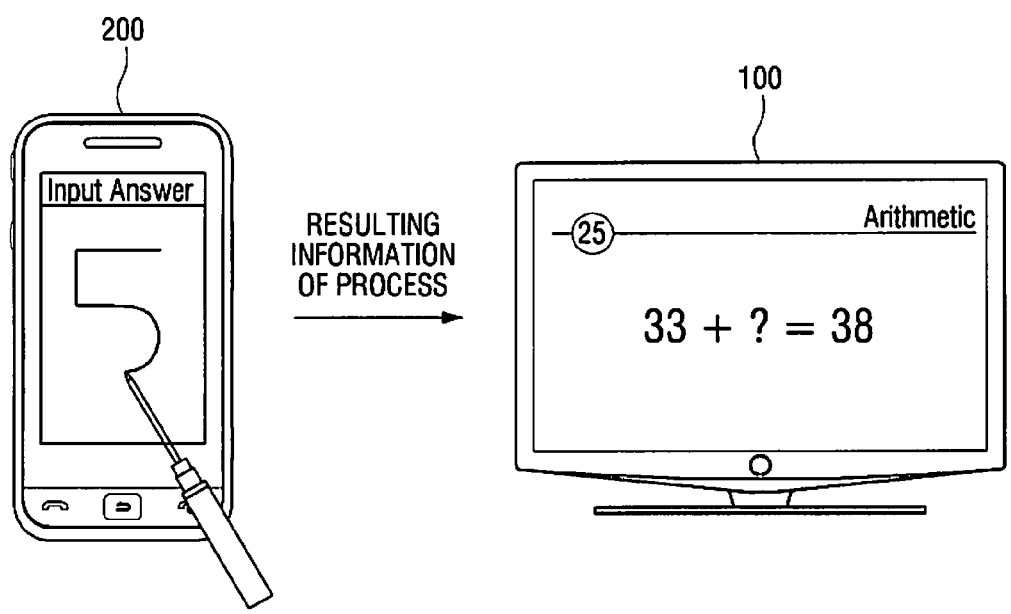
FIG. 7B illustrates a case where resulting information of a process is transmitted to the TV when a user inputs a handwriting touch manipulation into the mobile phone according to an embodiment of the present invention.

FIG. 7B illustrates a case where resulting information of a process is transmitted to the TV 100 when a user inputs a handwriting touch manipulation into the mobile phone 200. As shown in FIG. 7B, when the user inputs a handwriting touch manipulation into a touch screen of the mobile phone 200 in order to input an answer to a quiz, the mobile phone 200 recognizes the touch manipulation information as text information through handwriting recognition, carries out a process on whether the recognized text information is a correct answer or not, and transmits resulting information of the process (that is, information on whether the answer is correct or not) to the TV 100. Then, the TV 100 executes a TV quiz application to determine whether the answer is correct or not using the received resulting information.

Figure 8A:
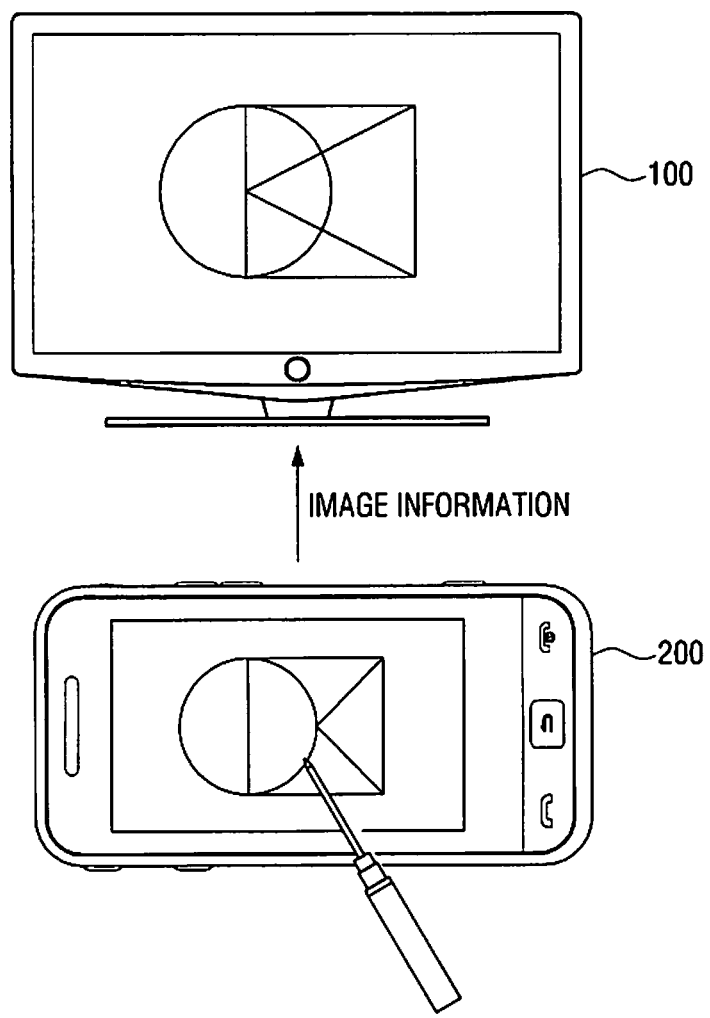
FIG. 8A illustrates a case where image information is transmitted to the TV when a user inputs a handwriting touch manipulation into the mobile phone according to an embodiment of the present invention.

FIG. 8A illustrates a case where image information is transmitted to the TV 100 when a user inputs a handwriting touch manipulation into the mobile phone 200. As shown in FIG. 8A, when the user inputs a handwriting touch manipulation into a touch screen of the mobile phone 200 in order to input an answer to a quiz, the mobile phone 200 transmits image information generated by the touch manipulation to the TV 100. Then, the TV 100 carries out a process on whether the answer is correct or not using the image information and executes a TV quiz application to determine whether the answer is correct or not.

Figure 8B:
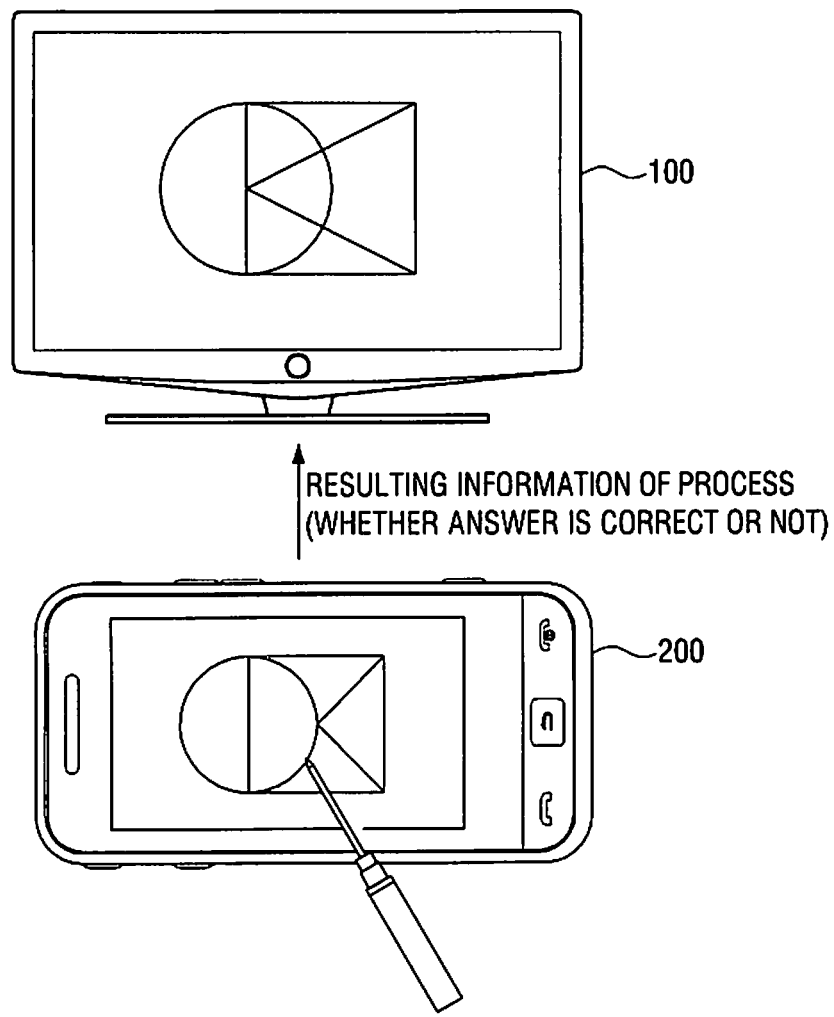
FIG. 8B illustrates a case where resulting information of a process is transmitted to the TV when a user inputs a handwriting touch manipulation into the mobile phone according to an embodiment of the present invention.

FIG. 8B illustrates a case where resulting information of a process is transmitted to the TV 100 when a user inputs a handwriting touch manipulation to the mobile phone 200. As shown in FIG. 8B, when the user inputs a handwriting touch manipulation into a touch screen of the mobile phone 200 in order to input an answer to a quiz, the mobile phone 200 recognizes the touch manipulation information as an image using handwriting recognition, carries out a process on whether the recognized image is a correct answer or not, and transmits resulting information of the process (that is, information on whether the answer is correct or not) to the TV 100. Then, the TV 100 executes a TV quiz application to determine whether the answer is correct or not using the received resulting information.

Figure 8C:
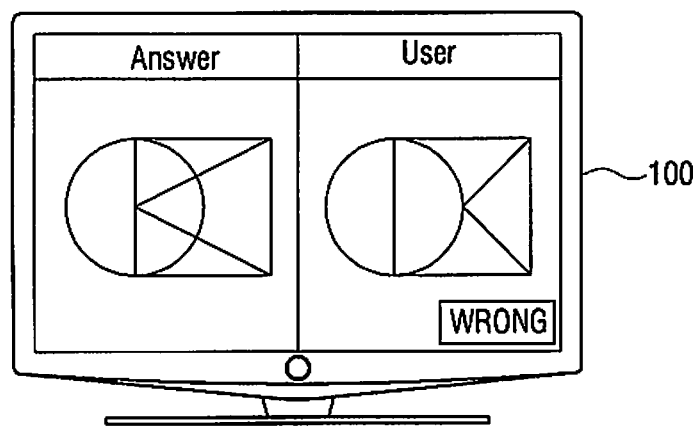
FIG. 8C illustrates a screen displaying whether information input by a user is a correct answer or not according to an embodiment of the present invention.

FIG. 8C illustrates a screen displaying whether information input by a user is a correct answer or not according to an exemplary embodiment. As shown in FIG. 8C, when a drawn image input by a user is a wrong answer, the TV 100 controls a TV application to display a message informing that the answer is wrong.

Figure 9:
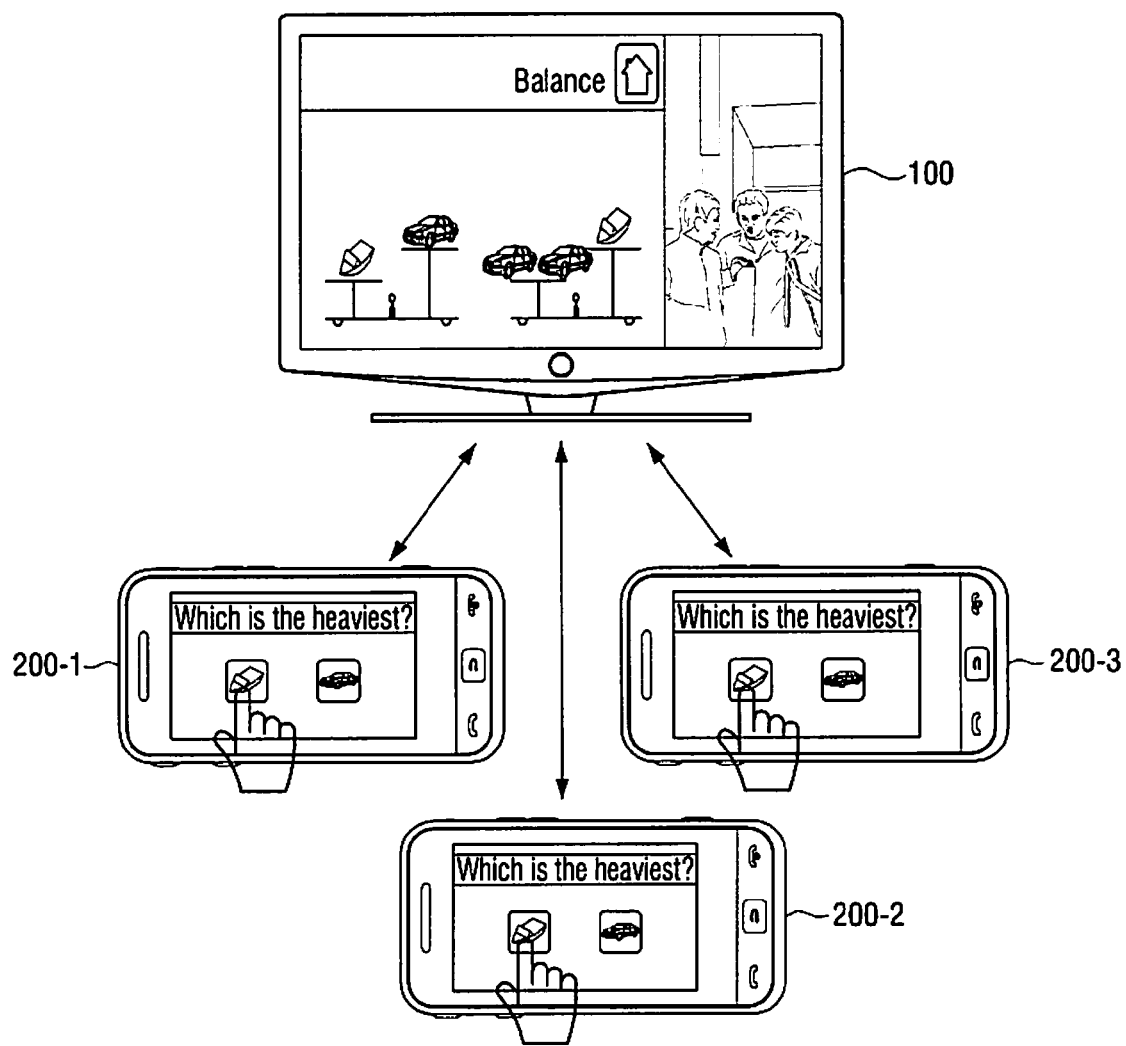
FIG. 9 illustrates a system in which a plurality of mobile phones are connected with a single TV according to another embodiment of the present invention.

As described above, the TV 100 receives the specific information from the mobile phone 200 and executes the quiz application according to the specific information. FIG. 9 illustrates a system in which a plurality of mobile phones 200-1, 200-2, and 200-3 are connected with a single TV 100 according to an embodiment of the present invention. As shown in FIG. 9, the TV 100 receives specific information from the plurality of mobile phones 200-1, 200-2, and 200-3. Also, the TV 100 processes data received from each of the plurality of mobile phones 200-1, 200-2, and 200-3 distinctively. Accordingly, the TV 100 controls the TV application using the plurality of mobile phones 200-1, 200-2, and 200-3.

In the above embodiments, the TV 100 has been utilized as the display apparatus. However, any display apparatus can be used that can execute an application.

In the above embodiments, the mobile phone 200 has been utilized as the mobile communication terminal. However, any mobile communication terminal can be used that can execute an application and receive various types of manipulations. For example, a Personal Digital Assistant (PDA) may be used as the mobile communication terminal.

The foregoing embodiments and advantages are merely exemplary and are not to be construed as limiting the present invention. The present invention can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method for controlling a display apparatus which is communicably connected with a mobile device, by the display apparatus, the method comprising:

storing, at the display apparatus, a first application to be executed in the display apparatus and a second application to be executed in the mobile device;

executing the first application at the display apparatus;

transmitting the second application from the display apparatus to the mobile device;

receiving, at the display apparatus from the mobile device, first information generated by the mobile device using the second application; and displaying, at the display apparatus, second information generated by processing the first information, based on an execution state of the first application, wherein the first application and the second application are executed in association with each other, wherein, when the second application is executed on the mobile device, the mobile device is configured to serve as a user interface apparatus for the first application executing at the display apparatus, wherein the mobile device receives at least one of voice information, touch manipulation information, and motion information of a user as the first information, and wherein the execution state of the first application is controlled according to at least one of the voice information and the touch manipulation information recognized as text information touch speech recognition and handwriting recognition.

2. The method as claimed in claim 1, wherein the first information is information that is input into the mobile device.

3. The method as claimed in claim 1, wherein the first information is resulting information that is a result of processing information input into the mobile device.

4. The method as claimed in claim 1, wherein the mobile device carries out a process on the text information, and extracts resulting information of the process,
wherein receiving the first information comprises receiving the resulting information of the process from the mobile device, and
wherein the execution state of the first application is controlled according to the received resulting information of the process.

5. The method as claimed in claim 1, further comprising:
receiving user information from the mobile device;
recognizing a user of the mobile device using the received user information.

6. A method, by a mobile device, for controlling the mobile device which is communicably connected with a display apparatus which stores a first application to be executed in the display apparatus and a second application to be executed in the mobile device, the method comprising:
receiving, at the mobile device, the second application from the display apparatus when the first application is being executed in the display apparatus;
executing the received second application at the mobile device;
generating first information according to a user's manipulation when using the second application; and
transmitting the first information from the mobile device to the display apparatus for displaying second information generated by processing the first information, based on an execution state of the first application,
wherein the first application and the second application are executed in association with each other,
wherein, when the second application is executed at the mobile device, the mobile device is configured to serve as a user interface apparatus for the first application executing at the display apparatus,
wherein the mobile device receives at least one of voice information, touch manipulation information, and motion information of a user as the first information, and
wherein the execution state of the first application is controlled according to at least one of the voice information and the touch manipulation information recognized as text information touch speech recognition and handwriting recognition.

7. A method, by a mobile device, for controlling the mobile device which is communicably connected with a display apparatus which stores a first application to be executed in the display apparatus and a second application to be executed in the mobile device, the method comprising:
receiving, at the mobile device, the second application from the display apparatus when the first application is being executed in the display apparatus;
executing the received second application at the mobile device;
generating first information according to a user's manipulation when the second application is being executed;
carrying out a process on the first information and extracting resulting information of the process; and
transmitting, from the mobile device to the display apparatus, the extracted resulting information of the process for displaying second information generated by processing the extracted resulting information, based on an execution state of the first application,
wherein the first application and the second application are executed in association with each other,
wherein, when the second application is executed at the mobile device, the mobile device is configured to serve as a user interface apparatus for the first application executing at the display apparatus,
wherein the mobile device receives at least one of voice information, touch manipulation information, and motion information of a user as the first information, and
wherein the execution state of the first application is controlled according to at least one of the voice information and the touch manipulation information recognized as text information touch speech recognition and handwriting recognition.

8. The method as claimed in claim 7,
wherein carrying out the process comprises carrying out a process on the text information, and extracting resulting information of the process, and
wherein transmitting the extracted resulting information comprises transmitting the extracted resulting information of the process to the display apparatus.

* * * * *